(12) United States Patent
Lee et al.

(10) Patent No.: US 8,880,129 B2
(45) Date of Patent: Nov. 4, 2014

(54) MOBILE TERMINAL

(71) Applicant: LG Electronics Inc., Seoul (KR)

(72) Inventors: Hyunwoo Lee, Incheon (KR); Wonseok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/758,682

(22) Filed: Feb. 4, 2013

(65) Prior Publication Data

US 2013/0217444 A1    Aug. 22, 2013

(30) Foreign Application Priority Data

Feb. 17, 2012  (KR) ........................ 10-2012-0016511

(51) Int. Cl.
*H04M 1/00*  (2006.01)
*H05K 7/00*  (2006.01)
*G06F 1/16*  (2006.01)
*H04M 1/02*  (2006.01)

(52) U.S. Cl.
CPC .......... *H04M 1/0266* (2013.01); *H04M 1/0249* (2013.01); *H04M 1/0262* (2013.01); *H04M 2001/0204* (2013.01); *G06F 1/1626* (2013.01); *G06F 1/1635* (2013.01)
USPC ..... 455/575.1; 455/347; 455/349; 455/575.8; 361/679.01; 361/679.3; 361/752; 361/760

(58) Field of Classification Search
CPC .......................... H04M 1/0262; H04M 1/0266
USPC ................. 455/575.1, 575.8, 90.3, 347, 349; 361/679.01, 752, 760
See application file for complete search history.

(56) References Cited

U.S. PATENT DOCUMENTS

| | | | |
|---|---|---|---|
| 8,270,158 B2 * | 9/2012 | Matsuoka | ................ 361/679.55 |
| 8,446,740 B2 * | 5/2013 | Yoshida | ........................ 361/829 |
| 8,537,543 B2 * | 9/2013 | Wang et al. | ............. 361/679.56 |
| 2003/0083019 A1 * | 5/2003 | Wong et al. | ..................... 455/90 |
| 2008/0037771 A1 * | 2/2008 | Black et al. | ............. 379/433.01 |
| 2008/0094787 A1 * | 4/2008 | Kabeya | ........................ 361/681 |
| 2008/0304216 A1 * | 12/2008 | Lu | ................................. 361/681 |
| 2012/0050988 A1 * | 3/2012 | Rothkopf et al. | ............. 361/688 |

FOREIGN PATENT DOCUMENTS

KR    10-0813692 B1    3/2008

* cited by examiner

*Primary Examiner* — Duc M Nguyen
(74) *Attorney, Agent, or Firm* — Birch, Stewart, Kolasch & Birch, LLP

(57) ABSTRACT

A mobile terminal is provided. The mobile terminal includes a terminal body, a window disposed at one surface of a terminal body, a first frame having a space for mounting one or more components, the first frame having a first cavity, a display configured to output visual information through the window, the display being located at the first cavity, a battery configured to supply power to the terminal body, the battery being located at the first cavity, and a separation sheet coupled to the first frame to separate a first region of the terminal body where the display is located from a second region of the terminal body where the battery is located. A periphery of the separation sheet contacts the bottom of the first cavity.

17 Claims, 12 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2012-0016511, filed on Feb. 17, 2012, the contents of which is incorporated by reference herein in its entirety.

BACKGROUND OF THE INVENTION

1. Field of the Invention

The present invention relates to a mobile terminal, and particularly, to a mobile terminal having a slim structure.

2. Description of Related Art

A mobile terminal is a device that can be carried around and has one or more functions such as to perform voice and video call communications, inputting and outputting information, storing data, and the like.

As functions of the mobile terminal become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Various attempts have been made to implement complicated functions in such a multimedia device by means of hardware or software. For instance, a user interface (UI) for allowing a user to search for or select a function in easy and convenient manners may be included.

In addition, a more enhanced method implemented using hardware may be considered. Such structural enhanced method includes a structural change and improvement for providing a slimmer mobile terminal. In addition, a new structure for implementing a slim mobile terminal may be implemented by simplifying coupling of components.

BRIEF SUMMARY OF THE INVENTION

Therefore, an aspect of the detailed description is to provide a mobile terminal capable of having a slimmer structure by reducing the thickness through simplified coupling of components.

To achieve these and other advantages and in accordance with the purpose of this specification, as embodied and broadly described herein, there is provided a mobile terminal having a terminal body, a window disposed at one surface of a terminal body, a first frame having a space for mounting one or more components, the first frame having a first cavity, a display configured to output visual information through the window, the display being located at the first cavity, a battery configured to supply power to the terminal body, the battery being located at the first cavity, and a separation sheet coupled to the first frame to separate a first region of the terminal body where the display is located from a second region of the terminal body where the battery is located. A periphery of the separation sheet contacts the bottom of the first cavity.

Further scope of applicability of the present application will become more apparent from the detailed description given hereinafter. However, it should be understood that the detailed description and specific examples, while indicating preferred embodiments of the invention, are given by way of illustration only, because various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. Hereinafter, a mobile terminal according to the present invention will be explained in more detail with reference to the attached drawings. The suffixes attached to components of the mobile terminal, such as 'module,' 'unit,' or 'portion' were used for facilitation of the detailed description of the present invention. Therefore, the suffixes do not have different meanings from each other.

The mobile terminal according to an exemplary embodiment of the present invention may include a portable phone, a smart phone, a laptop computer, a digital broadcasting terminal, Personal Digital Assistants (PDA), Portable Multimedia Player (PMP), an E-book, a navigation system, etc. However, it will be obvious to those skilled in the art that the present invention may be also applicable to a fixed terminal such as a digital TV and a desktop computer.

Figure 1:
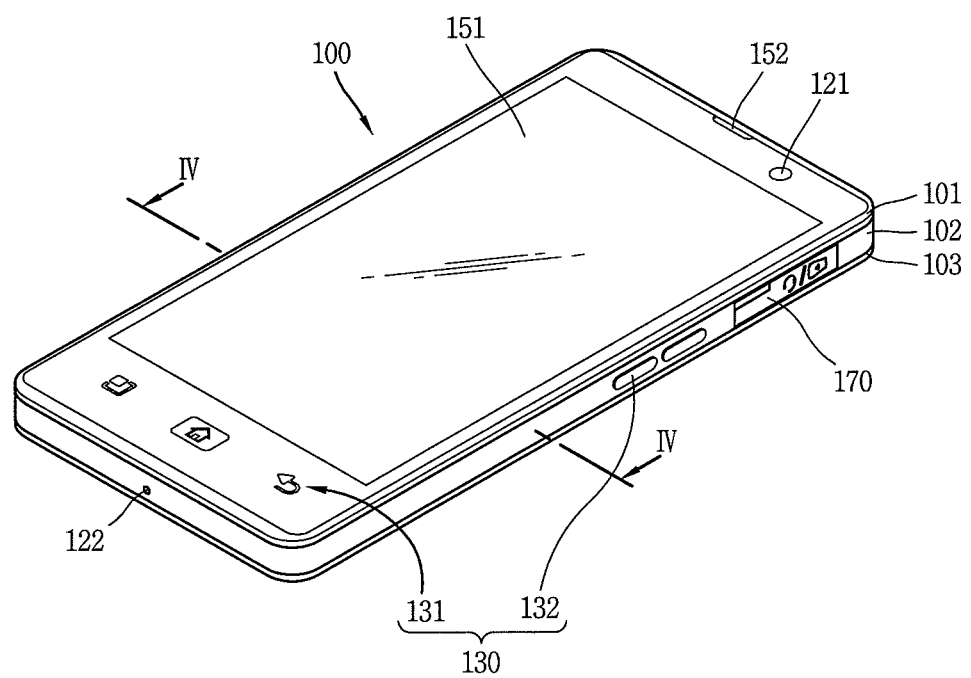
FIG. 1 is a front perspective view of a mobile terminal according to an exemplary embodiment of the present invention.

FIG. 1 is a front perspective view of a mobile terminal 100 according to an exemplary embodiment of the present invention. Referring to FIG. 1, the mobile terminal 100 according to an exemplary embodiment of the present invention is a bar type mobile terminal. However, the present invention is not limited to this type of terminal, but may be applied to a slide type in which two or more bodies are coupled to each other so as to perform a relative motion, a folder type, a swing type, a swivel type and the like.

A case (casing, housing, cover, etc.) forming an outer appearance of a terminal body may include a front case 101 and a rear case 102. At least one intermediate case may be disposed between the front case 101 and the rear case 102. In addition, a battery cover 103 for covering a power supply unit 190 may be detachably mounted to the rear case 102. Various components may be accommodated in a space formed by the front case 101 and the rear case 102. Such cases may be formed by injection-molded synthetic resin, or may be formed using a metallic material such as stainless steel (STS), titanium (Ti) and aluminum (Al).

A display unit 151, a first audio output unit 152, a first camera 121, a user input unit 130 and the like may be formed on the front surface of the terminal body. In addition, an audio input unit 122, an interface unit 170 and the like may be formed on the side surface of the terminal body.

The display unit 151 includes a liquid crystal display (LCD) module, an organic light emitting diodes (OLED) module, e-paper, etc. each for displaying information in a visual manner. The display unit 151 may include a touch sensing means for sensing content input in a touch manner. Once a region on the display unit 151 is touched, content corresponding to the touched region is input. Content input in a touch manner may be texts, or numbers, or menu items which can be instructed or set in each mode.

The touch sensing means may be formed to be light-transmissive so that the display unit 151 can be viewed, and may include a structure for enhancing visibility of the display unit 151 at a bright place. Referring to FIG. 1, the display unit 151 occupies a majority of the front surface of the front case 101.

The first audio output unit 152 and the first camera 121 are disposed at a region close to one end of the display unit 151 and a user input unit 131 and an audio input unit 122 are disposed at a region close to another end of the display unit 151. A user input unit 132 may be disposed on the side surface of the terminal body. The first audio output unit 152 may be implemented as a receiver for transmitting a call sound to a user's ears, or a loud speaker for outputting each type of alarm sounds or a play sound of multimedia. The first camera 121 processes image data of still pictures or video acquired by an image capture device in a video capturing mode or an image capturing mode. The processed image frames may be displayed on the display unit 151.

The user input unit 130 is manipulated to receive a command for controlling the operation of the mobile terminal 100, and may include the manipulation units 131 and 132. The manipulation units 131 and 132 may be referred to as manipulating portions, and may include any type of manipulation units that can be manipulated by a user in a tactile manner. The first and second manipulation units 131 and 132 may be set to receive inputs in various manners. For instance, the first manipulation unit 131 may be configured to input commands such as START, END, and SCROLL, and the second manipulation unit 132 may be configured to input commands such as controlling a volume of a sound output from the first audio output unit 152, or converting a mode of the display unit 151 into a touch recognition mode.

The audio input unit 122 may be implemented as a microphone for inputting a user's voice, other sounds, etc.

The interface unit 170 may be generally implemented to interface the mobile terminal 100 with external devices. For example, the interface unit 170 may include at least one of a connection terminal for wired or wireless connection with an earphone, a port for short-range communication (e.g., Infrared ray port (IrDA Port), Bluetooth port, wireless LAN port, etc.), and a power supply terminal for supplying power to the mobile terminal 100. Such interface unit 170 may be implemented as a socket for accommodating therein an external card such as a Subscriber Identity Module (SIM), a User Identity Module (UIM), and a memory card for information storage.

Figure 2:
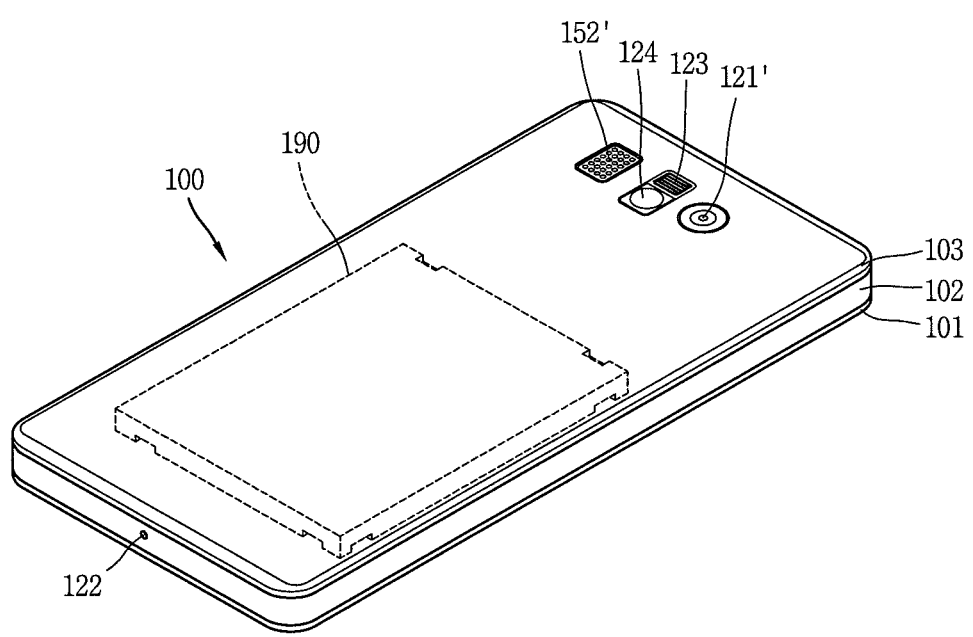
FIG. 2 is a rear perspective view of the mobile terminal of FIG. 1.

FIG. 2 is a rear perspective view of the mobile terminal 100 of FIG. 1. Referring to FIG. 2, a second camera 121' may be additionally mounted to the rear surface of the terminal body. The second camera 121' faces a direction which is opposite to a direction faced by the first camera 121 (shown in FIG. 1), and may have pixels different from those of the first camera 121. For example, the first camera 121 may operate with relatively lower pixels (lower resolution). Thus, the first camera 121 may be useful when a user can capture his or her face and send it to a calling party in a video call mode or the like. On the other hand, the second camera 121' may operate with a relatively higher pixels (higher resolution) such that it can be useful for a user to obtain higher quality pictures for later use. The first and second cameras 121 and 121' may be installed at the terminal body so as to be rotated or popped-up.

A flash 123 and a mirror 124 may be additionally disposed close to the second camera 121'. When capturing an object by using the second camera 121', the flash 123 provides light to the object. The mirror 124 can cooperate with the second camera 121' to allow a user to photograph himself or herself in a self-portrait mode.

A second audio output unit 152' may be additionally disposed on the rear surface of the terminal body. The second audio output module 152' may implement a stereo function together with the first audio output module 152 (shown in FIG. 1), and may be used for calling in a speaker phone mode.

A broadcast signal receiving antenna, as well as an antenna for calling may be additionally disposed on the side surface of the terminal body. One or both of the antennas may be installed to be retractable into the terminal body.

The power supply unit 190 for supplying power to the mobile terminal 100 is mounted to the terminal body. For example, the battery may be mounted in the terminal body or may be detachably mounted to the terminal body. The power supply unit 190 may be implemented as a battery for converting chemical energy into electric energy.

Recently, it has become desirable to provide a mobile terminal having a slim structure for facilitation of portability. The thickness of the mobile terminal is determined by components and the structure for supporting and accommodating the components. Hereinafter, a new structure for implementing a slimmer mobile terminal 100 will be explained in more details.

Figure 3:
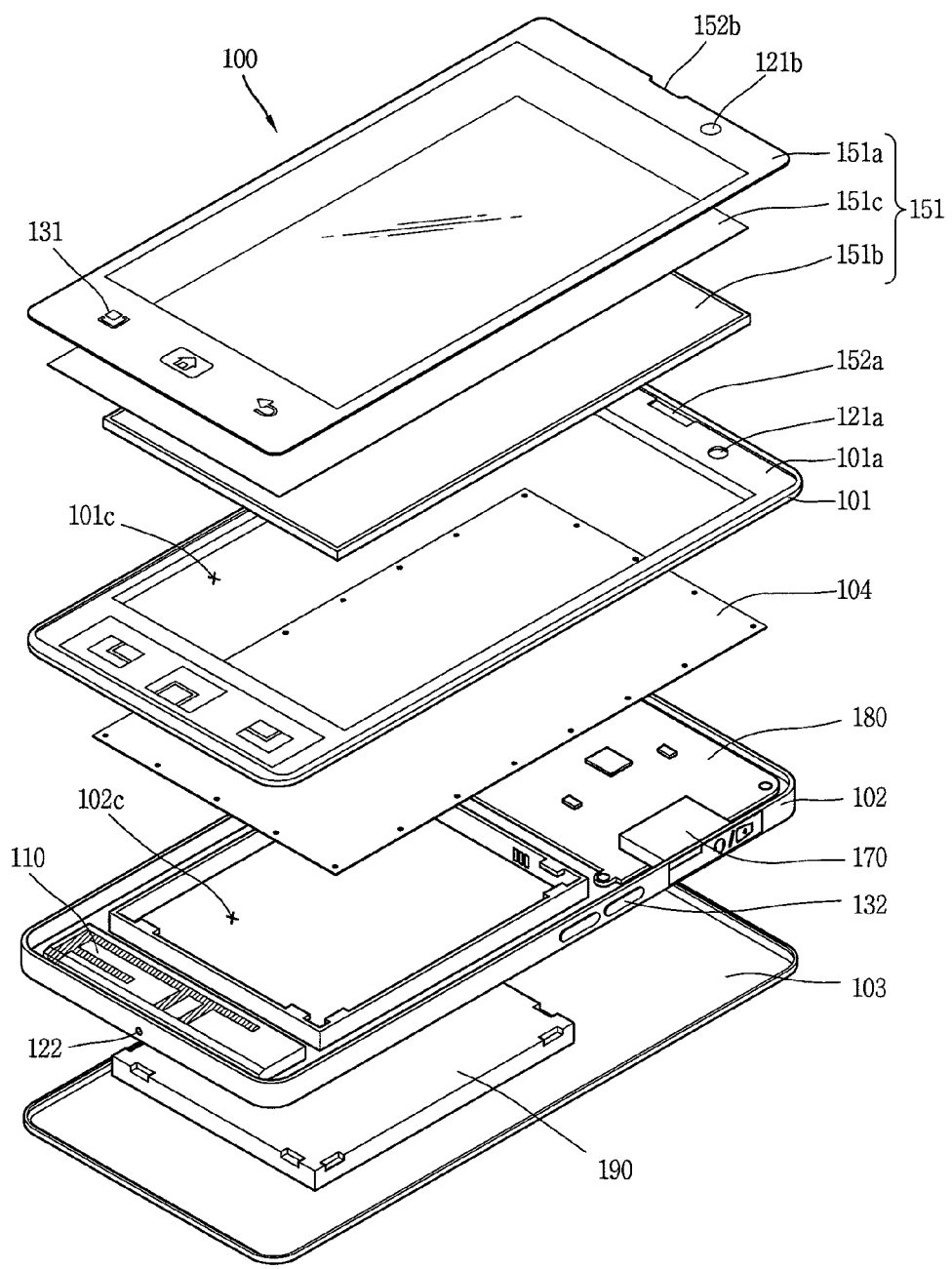
FIG. 3 is a disassembled perspective view of the mobile terminal of FIG. 1.
Figure 4:
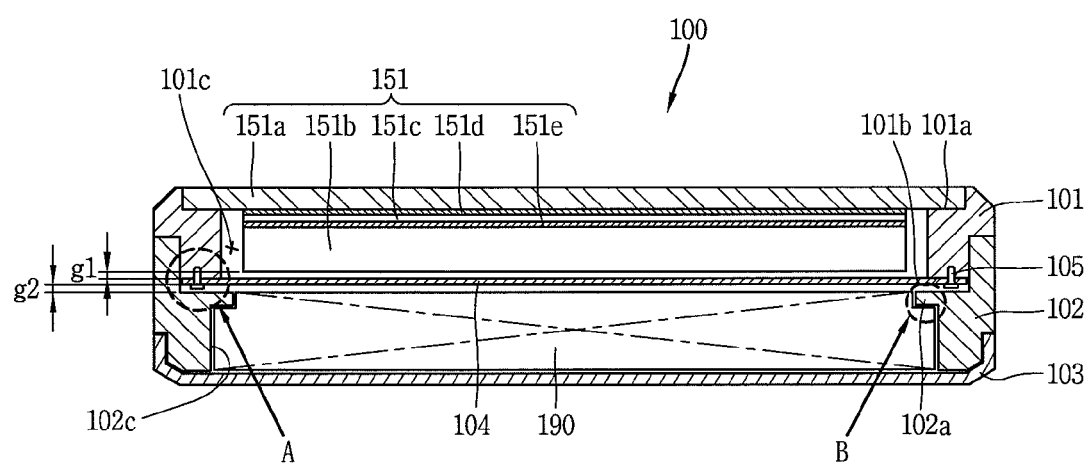
FIG. 4 is a sectional view taken along line 'IV-IV' in FIG. 1.

FIG. 3 is a disassembled perspective view of the mobile terminal 100 of FIG. 1, and FIG. 4 is a sectional view taken along line 'IV-IV' in FIG. 1. Referring to FIGS. 3 and 4, a circuit board 180 is disposed in the terminal body. As shown, the circuit board 180 may be mounted to the rear case 102, or may be installed at an additional inner structure. The circuit board 180 may be configured as an example of the controller for executing the various functions of the mobile terminal 100.

One or more antenna modules 110 for enabling radio communication between the mobile terminal 100 and a radio communication system, or between the mobile terminal and a network where the mobile terminal 100 is positioned, may be included in the terminal body. The circuit board 180 and the antenna module 110 may be disposed at opposite ends of the rear case 102 in a lengthwise direction and a second cavity 102c, which will be described in greater detail below, is disposed therebetween.

The mobile terminal 100 includes a first frame having a space for mounting one or more components and has a first cavity 101c. In this embodiment, the first frame is implemented as the front case 101 which forms the appearance of the terminal body. However, the frame may be implemented as an additional inner structure different from the front case 101.

A first mounting portion 101a and a second mounting portion 101b may be formed at the front case 101. The first mounting portion 101a is recessed from one surface of the front case 101, and has a space for mounting the window 151a. The second mounting portion 101b (see FIG. 4) is formed on the rear surface of the first mounting portion 101a, and has a space for mounting a separation sheet 104. As shown, the second mounting portion 101b may implement another surface of the front case 101, or may be recessed from another surface of the front case 101.

The first cavity 101c indicates an inner space of the front case 101, i.e., a space between one surface and another surface of the front case 101. Accordingly, the first cavity 101c may be understood as a space larger than a space between virtual planes at the first and second mounting portions 101a and 101b.

A hole 121a corresponding to the first camera 121 and a sound hole 152a corresponding to the first audio output unit 152 are formed at the first and second mounting portions 101a and 101b. The sound hole 152a may be disposed close to a side wall of the front case 101.

The display unit 151 for displaying information processed by the mobile terminal 100 is disposed on one surface of the terminal body. The display unit 151 may be disposed to occupy a majority of the front surface of the terminal body. The display unit 151 includes the window 151a and a display 151b.

The window 151a is mounted to the first mounting portion 101a. The window 151a may be formed of a light-transmissive material, e.g., light-transmissive synthetic resin, reinforcing glass and the like. The window 151a may be formed to have a non-transmissive region. A light-transmissive region of the window unit 151a may have an area corresponding to the display 151b. Accordingly, a user can recognize visual information output from the display 151 from the outside.

A recess 152b may be formed on a side surface of the window 151a, for example, the side surface facing a side wall of the front case 101, to form an assembly gap. With this structure, sound generated from the first audio output unit 152 is emitted via the assembly gap between the front case 101 and the window 151b. Accordingly, the mobile terminal requires no additional hole for outputting sound, thereby having a more simple appearance.

The display 151b may be coupled to the rear surface of the window 151a to provide modularized arrangement, and is accommodated in the first cavity 101c. The display 151b is electrically connected to the circuit board 180 and is configured to output visual information under control of the controller. The display 151b may have an area corresponding to a light-transmissive region of the window 151a.

A touch sensor 151c for sensing a touch input may be additionally disposed between the window 151a and the display 151b. The touch sensor 151c is configured to convert a change of a charge amount occurring from a specific part, into an electric input signal. The touch sensor 151c is formed to be light-transmissive so that an image formed on the display 151b can pass therethrough. Part of the touch sensor 151c corresponding to a region of the window 151a, the region where light passes through, implements an input region.

As best seen in FIG. 4, an adhesive layer 151d may be disposed between the window 151a and the touch sensor 151c for coupling therebetween, and an adhesive layer 151e may be disposed between the touch sensor 151c and the display 151b for coupling therebetween. An optical clear adhesive (OCA), super view resin (SVR) and the like may be used as the adhesive layers 151d and 151e.

The mobile terminal 100 includes a second frame coupled to the first frame, and the second frame has a space for accommodating the battery 190 therein. In this exemplary embodiment, the second frame is implemented as the rear case 102 which forms the appearance of the terminal body. However, the second frame may be implemented as an additional inner structure different from the rear case 102. The rear case 102 may be disposed to cover the second mounting portion 101b by being coupled to the front case 101. The rear case 102 may protrude towards the second mounting portion 101b, so that at least part thereof can be accommodated in the first cavity 101c.

The battery 190 is accommodated in the rear case 102 and is configured to supply power to the terminal body. The battery 190 may be disposed so that at least part thereof can be accommodated in the first cavity 101c of the front case 101.

The separation sheet 104 is disposed at the front case 101 so as to cover the first cavity 101e. The separation sheet 104 is configured to separate a first region where the display 151b is disposed from a second region where the battery 190 is disposed. The first and second regions may be understood as regions on upper and lower surfaces of the separation sheet 104, respectively. The separation sheet 104 serves to divide the space into two parts to prevent the display 151b and the battery 190 from directly contacting each other when external impacts are applied thereto. However, the separation sheet 104 need not always support the display 151b and the battery 190. The separation sheet 104 may have a small thickness (e.g., 0.1 mm~0.2 mm) and may be implemented as a metallic sheet (e.g., stainless steel) having high integrity and low surface roughness.

In this exemplary embodiment, the display 151b is spaced from one surface of the separation sheet 104 with a first gap (g1) and the battery 190 is spaced from another surface of the separation sheet 104 with a second gap (g2). The first gap (g1) and the second gap (g2) serve to separate the display 151b and the battery 190 from each other so that the display 151b and the battery 190 cannot influence each other even if they are transformed in a thickness direction due to external impacts.

Various embodiments of a structure for coupling the separation sheet 104 to the front case 101 so as to cover the first cavity 101c will be described. The same or similar components corresponding to those of the aforementioned embodiment will be provided with the same or similar reference numerals and explanations thereof will be omitted.

Figure 5A:
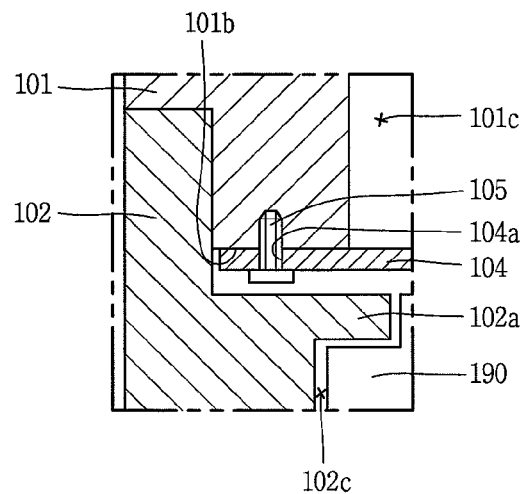
FIG. 5A is a conceptual view of part A of FIG. 4 showing a separation sheet coupled to a front case via a coupling member.
Figure 5B:
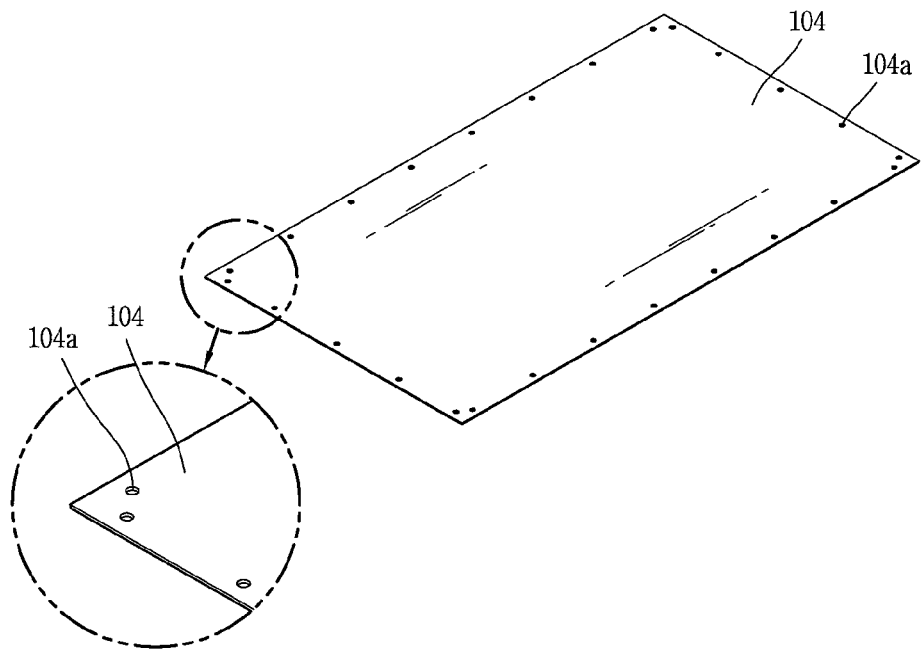
FIG. 5B is a conceptual view showing the separation sheet of the mobile terminal of FIG. 5A.

FIG. 5A is a conceptual view of part A of FIG. 4 showing the separation sheet 104 coupled to the front case 101 via a coupling member 105 and FIG. 5B is a conceptual view showing the separation sheet 104 of FIG. 5A. Referring to FIGS. 5A and 5B, the second mounting portion 101b projects from a surface of the front case 101 and may be formed in a loop shape on the edges of the front case 101. The separation sheet 104 is mounted to the second mounting portion 101b so as to cover the first cavity 101c.

A coupling hole 104a through which the coupling member 105 passes is formed at the separation sheet 104. A plurality of coupling holes 104a may be provided where the coupling holes 104a are spaced from each other, at preset intervals, along an edge region of the separation sheet 104. The edge region is disposed to cover the second mounting portion 101b, which is formed in a loop shape corresponding to the second mounting portion 101b. Because the coupling member 105 is coupled to the front case 101 via the coupling hole 104a, the separation sheet 104 is fixed to the front case 101. The coupling member 105 may be implemented as a screw coupled to the front case 101. As a result, because the separation sheet 104 is firmly fixed to the front case 101, the rigidity of the separation sheet 104 can be enhanced.

Figure 6A:
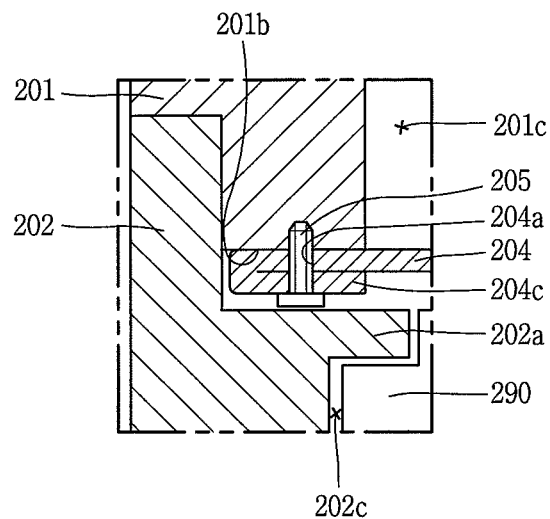
FIG. 6A is a conceptual view showing an alternative embodiment of part A of FIG. 4 showing a separation sheet having an overlapped portion formed at a coupling part of a separation sheet.
Figure 6B:
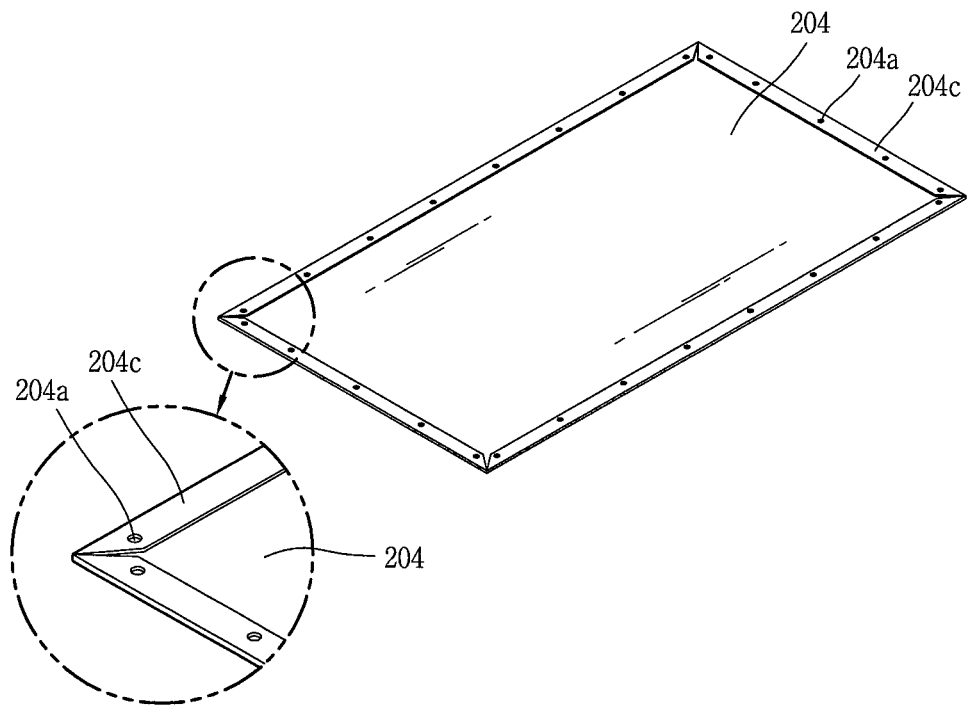
FIG. 6B is a conceptual view showing the separation sheet of FIG. 6A.

FIG. 6A is a conceptual view showing an alternative embodiment of part A of FIG. 4 showing an overlapped portion 204c formed at a coupling part of a separation sheet 204 and FIG. 6B is a conceptual view showing the separation sheet 204 of FIG. 6A. Referring to FIGS. 6A and 6B, the separation sheet 204 includes overlapped portions 204c disposed on edge regions thereof so as to cover the second mounting portion 201b. As shown, the overlapped portion 204c may be formed by hemming the edges of the separation sheet 204. Alternatively, the overlapped portion 204c may be formed as an additional sheet attached to the edge regions of the separation sheet 204.

Coupling holes 204a are formed at the overlapped portion 204c and coupling members are coupled to the front case 201 via the coupling holes 204a. As a result, a predetermined thickness of the separation sheet 204 for coupling the separation sheet 204 to the front case 201 can be obtained due to the overlapped portions 204c. Accordingly, the separation sheet 204 can be more firmly coupled to the front case 201, which allows the rigidity of the separation sheet 204 to be enhanced.

Figure 7A:
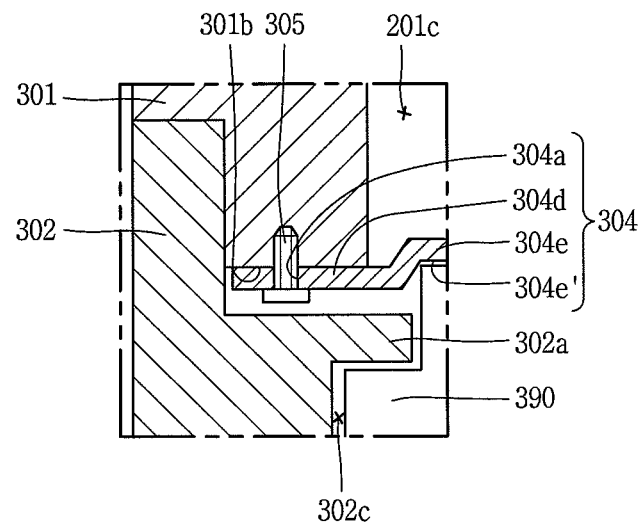
FIG. 7A is a conceptual view showing another alternative embodiment of part A of FIG. 4 showing a protrusion portion formed at a separation sheet.
Figure 7B:
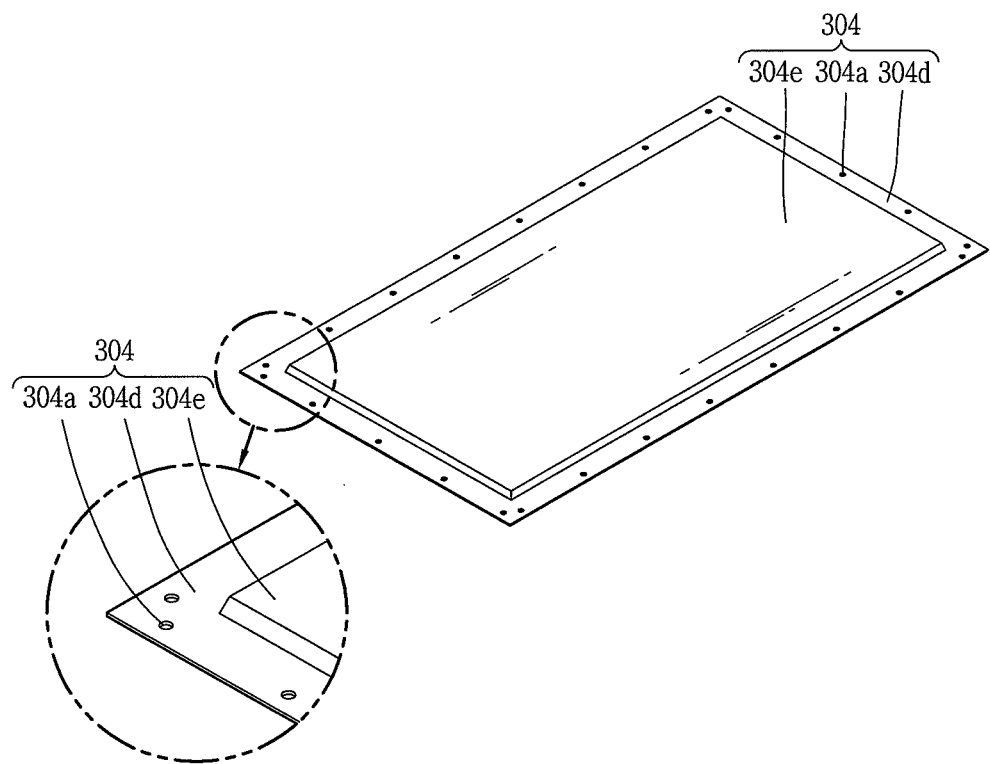
FIG. 7B is a conceptual view showing the separation sheet of FIG. 7A.

FIG. 7A is a conceptual view showing an alternative embodiment of part A of FIG. 4 showing a protrusion portion 304e formed at a separation sheet 304 and FIG. 7B is a conceptual view showing the separation sheet 304 of FIG. 7A. Referring to FIGS. 7A and 7B, the separation sheet 304 includes a coupling portion 304d and a protrusion portion 304e. The coupling portion 304d is coupled to a front case 301 so as to cover a second mounting portion 301b. The protrusion portion 304e is covered by the coupling portion 304d and protrudes towards a first region where the display 351b is disposed.

The protrusion portion 304e is implemented by pressing, which allows the rigidity of the separation sheet 304 to be obtained. The protrusion portion 304e may be disposed to be accommodated between virtual planes of a first mounting portion 301a and the second mounting portion 301b. A battery 390 may be disposed to be accommodated in a recessed portion 304e' formed from the rear surface of the protrusion portion 304e. In addition, the battery 390 may protrude past a virtual plane of the coupling portion 304d. In this manner, a larger accommodation space for the battery 390 can be obtained.

Figure 8A:
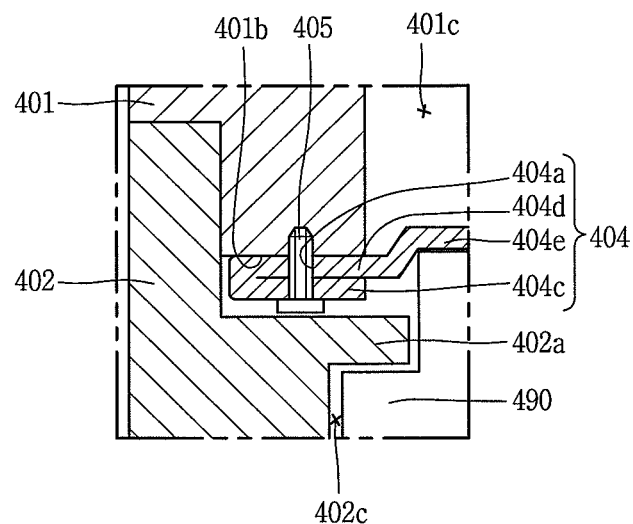
FIG. 8A is a conceptual view showing another alternative embodiment of part A of FIG. 4 showing a protrusion portion formed at a separation sheet and an overlapped portion is formed at a coupling part.
Figure 8B:
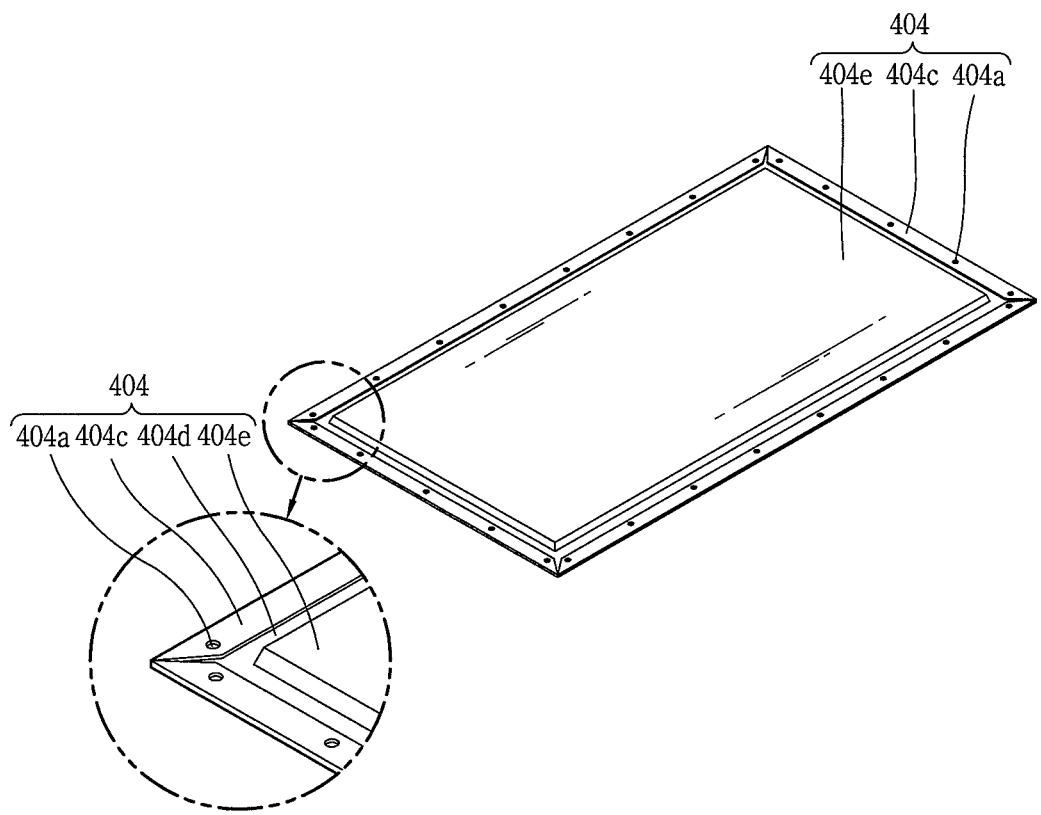
FIG. 8B is a conceptual view showing the separation sheet of FIG. 8A.

FIG. 8A is a conceptual view showing an alternative embodiment of part A of FIG. 4 showing a protrusion portion 404e formed at a separation sheet 404 and an overlapped portion 404c is formed at a coupling part. FIG. 8B is a conceptual view showing the separation sheet 404 of FIG. 8A. Referring to FIGS. 8A and 8B, the structure of this embodiment can be implemented through combination of the overlapped portions 204c of FIGS. 6A and 6B and the protrusion portion 304e of FIGS. 7A and 7B. That is, this structure is implemented by an overlapped structure for enhancing a coupling force and rigidity and a protruded structure for obtaining an accommodation space for a battery 490.

Figure 9A:
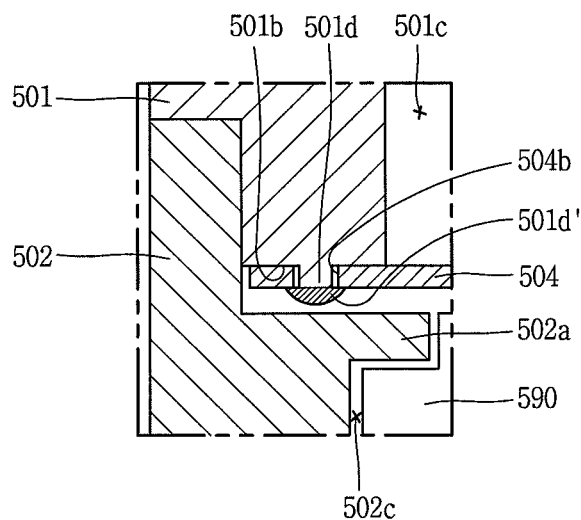
FIG. 9A is a conceptual view showing another alternative embodiment of part A of FIG. 4 showing a boss of a front case inserted into a through hole.
Figure 9B:
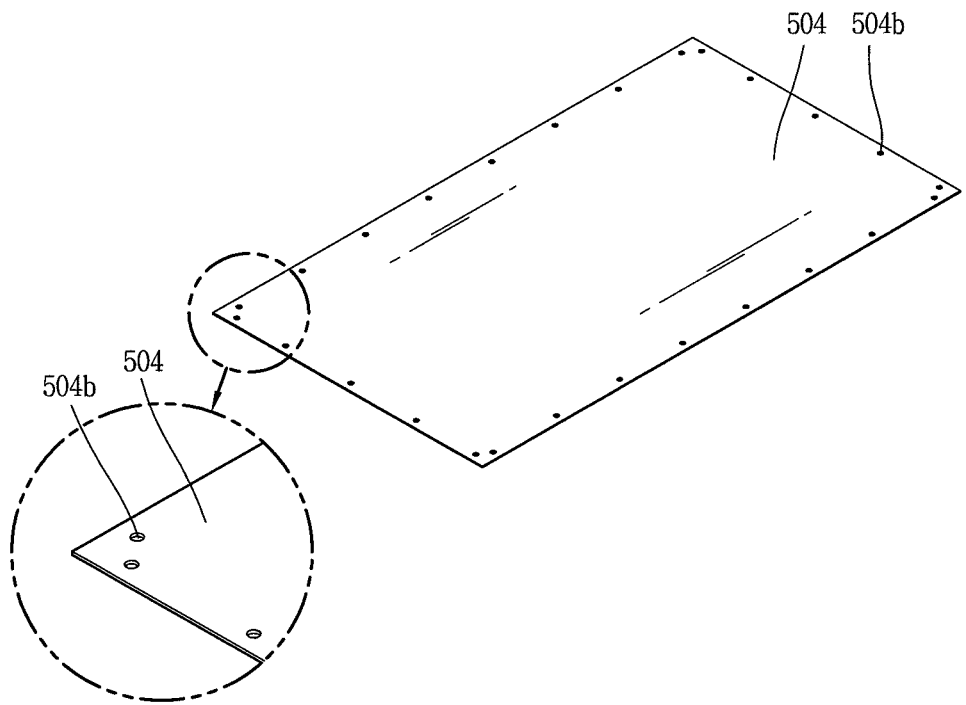
FIG. 9B is a conceptual view showing the separation sheet of FIG. 9A.

FIG. 9A is a conceptual view showing an alternative embodiment of part A of FIG. 4 showing a boss 501d of a front case 501 inserted into a through hole 504b and FIG. 9B is a conceptual view showing a separation sheet 504 of FIG. 9A. Referring to FIGS. 9A and 9B, the bosses 501d protrude from the front case 501. For example, the bosses 501d may protrude from a second mounting portion 501b and may be spaced from each other at preset intervals along the circumference of the second mounting portion 501b.

A through hole 504b for inserting the boss 501d is formed at the separation sheet 504. A plurality of through holes 504b may be provided. In addition, the plurality of through holes 504b are spaced from each other at preset intervals along edge regions of the separation sheet 504. The edge regions are disposed to cover the second mounting portion 501b, which is formed in a loop shape corresponding to the second mounting portion 501b.

The bosses 501d are configured to fix the separation sheet 504 to a preset position of the front case 501 by being inserted into the through holes 504b. The end of the boss 501d having been inserted into the through hole 504b is melted at high temperature and/or high pressure and then is solidified, thereby forming a melted portion 501d' which covers the through hole 504b. Therefore, the bosses 501d may serve as coupling members for coupling the separation sheet 504 to the front case 501.

Figure 10A:
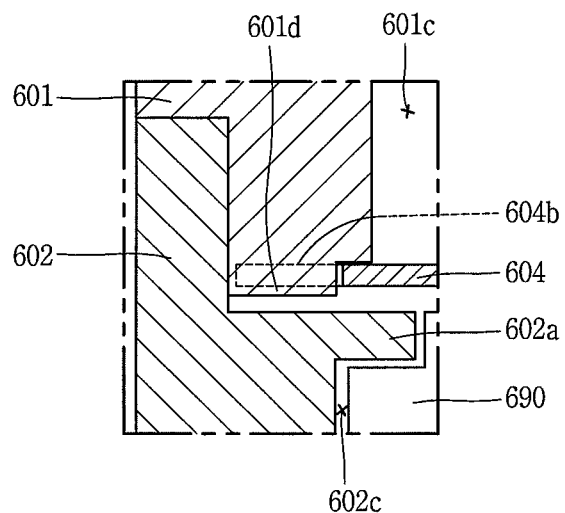
FIG. 10A is a conceptual view showing another alternative embodiment of part A of FIG. 4 showing a boss of a front case inserted into a through hole and a separation sheet coupled to the front case via a coupling member.
Figure 10B:
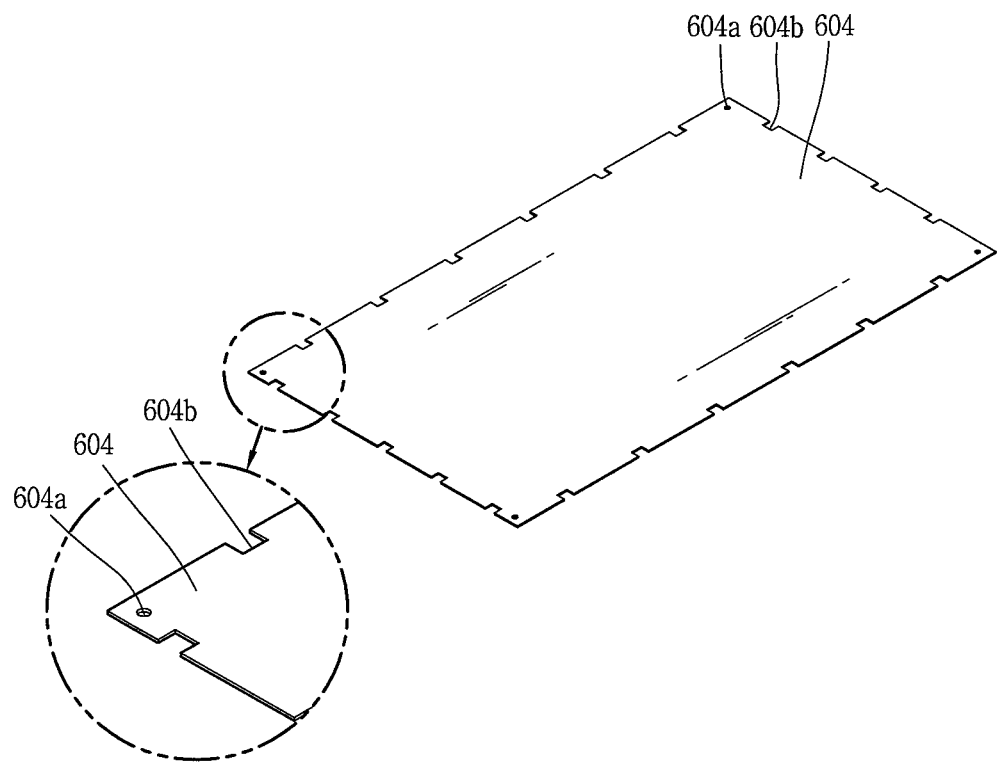
FIG. 10B is a conceptual view showing the separation sheet of FIG. 10A.

FIG. 10A is a conceptual view showing an alternative embodiment of part A of FIG. 4 showing a boss 601d of a front case 601 inserted into a through hole 604b and a separation sheet 604 is coupled to the front case 601 via a coupling member (not shown) similar to the coupling members of the previous alternative embodiments. FIG. 10B is a conceptual view showing the separation sheet 604 of FIG. 10A. Referring to FIGS. 10A and 10B, the through holes 604b are recessed from the edges of the separation sheet 604, thereby forming parts of the edges of the separation sheet 604. Coupling holes 604a are formed at corners of the separation sheet 604. Because coupling members are coupled to the front case 601 via the coupling holes 604a, the separation sheet 604 is fixed to the front case 601. In this manner, the separation sheet 604 is fixed to a preset position of a second mounting portion 601b by the bosses 601d inserted into the through holes 604b and the separation sheet 604 is firmly coupled to the front case 601 by the coupling members 605 inserted into the coupling holes 604a.

Various embodiments of a structure for mounting the battery 190 to the rear case 102 will now be described. The same or similar components as to those of the aforementioned embodiment will be provided with the same or similar reference numerals and explanations thereof will be omitted.

Figure 11A:
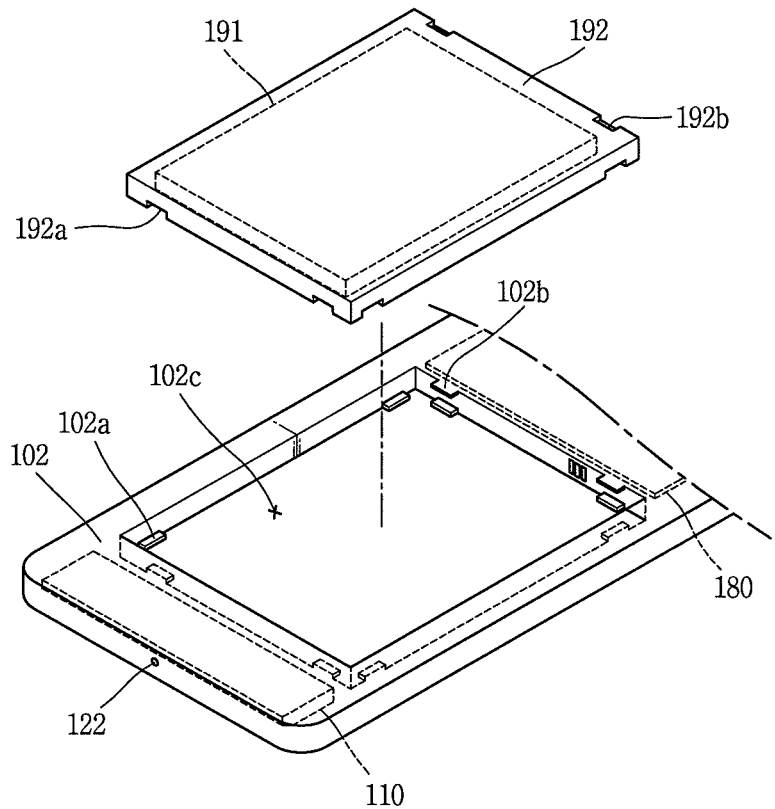
FIGS. 11A and 11B are conceptual views of an alternative embodiment of part B of FIG. 4 showing a battery accommodated in a rear case and a second cavity.
Figure 11B:
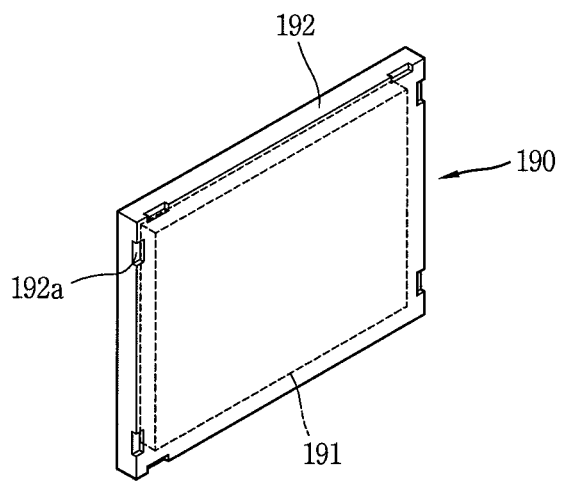

FIGS. 11A and 11B are conceptual views of an embodiment of part B of FIG. 4 showing the rear case 102 and the battery 190 accommodated in the rear case 102. Referring to FIG. 11, a second cavity 102c for accommodating the battery 190 is formed at the rear case 102. A locking protrusion 102a protrudes from an inner side surface of the rear case 102 forming the second cavity 102c. The locking protrusion 102a supports the battery 190 so that the battery 190 can maintain a spaced state from the separation sheet 104. As shown, one or more locking protrusions 102 are formed at the bottom of one or more inner side surfaces of the rear case 102.

Part of the battery 190 accommodated in the second cavity 102c may protrude from the second cavity 102c. As aforementioned in FIGS. 7A and 7B, because the battery 390 is accommodated in the recessed portion 304e' at the rear surface of the protrusion portion 104e, a large accommodation space for the battery 190 can be obtained.

The battery 190 includes a battery body 191, and a frame 192 configured to accommodate the battery body 191 therein. The battery body 191 is configured to convert chemical energy into electric energy, and is configured to supply power to the terminal body by being electrically connected to the circuit board 180. The frame 192 is configured to accommodate therein the battery body 191 and includes a locking groove 192a to cooperate with the locking protrusions 102a. As shown, the locking grooves 192a are formed on the bottom surface of the frame 192 in correspondence to the locking protrusions 102a.

An upward-motion preventing protrusion 102b for preventing the battery 190 from freely moving upward may be included at the rear case 102 so as to cover the upper end of the frame 192. The upward-motion preventing protrusion 102b may protrude from the upper end of the rear case 102. An upward-motion preventing groove 192b corresponding to the upward-motion preventing protrusion 102b is formed at the frame 192.

Figure 12A:
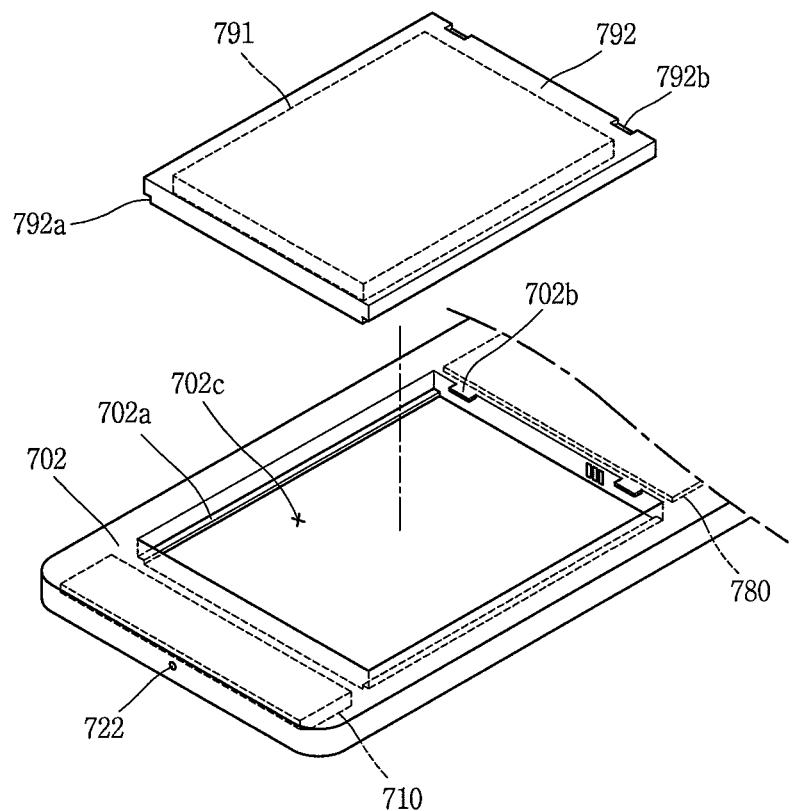
FIGS. 12A and 12B are conceptual views of an alternative embodiment of part B of FIG. 4 showing a battery accommodated in a rear case and a second cavity.
Figure 12B:
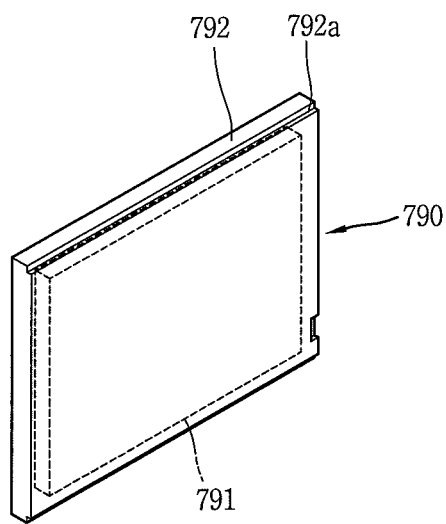

FIGS. 12A and 12B are conceptual views of an alternative embodiment of part B of FIG. 4 showing a rear case 702 and a battery 790 accommodated in the rear case 702. Referring to FIG. 12, locking protrusions 702a may protrude from two inner side surfaces of the rear case 702 forming the second cavity 702c and may extend in one direction. Said one direction may be a lengthwise direction or a widthwise direction of the terminal body. In this manner, the battery 790 can be detachably mounted to the second cavity 702c by a sliding motion and can be more firmly supported.

The present invention has the following advantages. First, because the display is coupled to the rear surface of the window thus to be accommodated in the first cavity, an additional supporting member which supports the display is not required.

Second, the display is disposed on one surface (first region) of the separation sheet and the battery is disposed on another surface (second region) of the separation sheet. Accordingly, the conventional structure can have a reduced thickness, thereby providing a mobile terminal with a slim structure.

Third, because the battery is supported by the locking protrusion of the second frame, an additional mounting surface for supporting the battery is not required.

Fourth, because the battery maintains a minimum gap from the display, the battery and the display do not influence on each other when external impacts are applied thereto. This can enhance reliability of the mobile terminal.

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a terminal body;
a window disposed at one surface of the terminal body;
a first frame having a space for mounting one or more components, the first frame having a first cavity;
a display configured to output visual information through the window, the display being located at the first cavity;
a battery configured to supply power to the terminal body; and
a separation sheet coupled to the first frame to separate a first region of the terminal body where the display is located from a second region of the terminal body where the battery is located,
wherein a periphery of the separation sheet contacts the bottom of the first frame,
wherein the first frame defines a side appearance of the terminal body,
wherein the first frame includes:
a first mounting portion recessed from one surface of the first frame to provide a space for mounting the window; and
a second mounting portion formed on a rear surface of the first mounting portion to provide a space for mounting the separation sheet, and
wherein the separation sheet includes:
a coupling portion coupled to the first frame to cover the second mounting portion; and
a protrusion portion enclosed by the coupling portion, the protrusion portion protruding towards the first region.

2. The mobile terminal of claim 1, wherein the display is spaced from one surface of the separation sheet by a first gap and the battery is spaced from another surface of the separation sheet by a second gap.

3. The mobile terminal of claim 1, wherein the battery is disposed such that at least part thereof is accommodated in the first cavity.

4. The mobile terminal of claim 1, further comprising:
a plurality of coupling holes spaced from each other at preset intervals along edge regions of the separation sheet; and a plurality of coupling members coupled to the first frame via the coupling holes, such that the separation sheet is fixed to the first frame.

5. The mobile terminal of claim 4, wherein the separation sheet includes overlapped portions overlapped with the edge regions so as to cover the first frame.

6. The mobile terminal of claim 5, wherein the overlapped portions are formed by hemming the edge regions.

7. The mobile terminal of claim 1, further comprising:
a plurality of through holes spaced from each other at preset intervals along edge regions of the separation sheet; and
a plurality of bosses protruding from the first frame, the bosses being inserted into the through holes to fix the separation sheet to the first frame.

8. The mobile terminal of claim 7, wherein the bosses are disposed to cover the through holes by being melted after being inserted into the through holes.

9. The mobile terminal of claim 7, further comprising:
a coupling hole formed at each corner of the separation sheet; and
a plurality of coupling members, each coupling member being coupled to the first frame via a corresponding coupling hole such that the separation sheet is fixed to the first frame.

10. The mobile terminal of claim 1, wherein the protrusion portion is disposed to be accommodated between virtual planes of the first and second mounting portions.

11. The mobile terminal of claim 1, wherein the battery is disposed to be accommodated in a recessed part formed at a rear surface of the protrusion portion.

12. The mobile terminal of claim 1, wherein the battery is disposed to protrude through a virtual plane of the coupling portion.

13. The mobile terminal of claim 1, further comprising a second frame having a second cavity forming a space for accommodating the battery therein, the second frame being coupled to the first frame.

14. The mobile terminal of claim 13, wherein the battery is disposed such that at least part thereof is protruding from the second cavity to be accommodated in the first cavity.

15. The mobile terminal of claim 13, further comprising a locking protrusion protruding from an inner side surface of the second frame at the second cavity to support the battery such that battery is spaced from the separation sheet.

16. The mobile terminal of claim 15, wherein the battery includes:
a battery body configured to convert chemical energy into electric energy; and
a frame disposed to enclose the battery body, the frame having a locking groove configured to cooperate with the locking protrusion.

17. The mobile terminal of claim 15, further an upward-motion preventing protrusion formed at the second frame so as to cover an upper end of the battery to prevent the battery from freely moving upward.

* * * * *